United States Patent [19]
Ruhe

[11] Patent Number: 6,108,889
[45] Date of Patent: Aug. 29, 2000

[54] BRAKE SHOE DERIVETER

[75] Inventor: Scott D. Ruhe, Yorba Linda, Calif.

[73] Assignee: Shepard-Thomason Co., La Habra, Calif.

[21] Appl. No.: 09/425,252

[22] Filed: Oct. 22, 1999

[51] Int. Cl.$^7$ .................................................. B23P 19/02
[52] U.S. Cl. ........................... 29/426.4; 29/426.5; 29/233
[58] Field of Search ................................ 29/233, 243.53, 29/252, 403.3, 426.4, 426.5

[56] References Cited

U.S. PATENT DOCUMENTS

| | | | |
|---|---|---|---|
| 2,711,775 | 6/1955 | Batchelor et al. | 29/233 |
| 2,979,243 | 4/1961 | Moeckel | 29/233 |
| 3,289,285 | 12/1966 | Conklin | 29/233 |
| 4,065,843 | 1/1978 | Elola | 29/252 |
| 4,312,107 | 1/1982 | White | 29/233 |
| 5,008,995 | 4/1991 | Johnson | 29/252 |
| 5,042,129 | 8/1991 | Seccombe | 29/233 |
| 5,177,849 | 1/1993 | Johnson | 29/252 |
| 5,621,958 | 4/1997 | Woodcox | 29/426.4 |

*Primary Examiner*—David P. Bryant
*Assistant Examiner*—Essama Omgba
*Attorney, Agent, or Firm*—Knobbe, Martens Olson & Bear, LLP

[57] ABSTRACT

An automated apparatus for removing rivets connecting a brake lining to a brake shoe is provided. One aspect of the invention includes a frame structure to which a brake shoe support assembly containing a plurality of curved supports is attached through a spring biased guide means. The brake shoe support assembly is rotatable through use of a stepper motor so rows of rivets on the brake shoe can be aligned with the rivet punch bits of the apparatus. The punch bits are mounted in a punch block that is rigidly attached to the frame structure. The punch block contains at least one module that that can be moved transversely with respect to the brake shoe so that the punch bits in the punch block can be aligned with the different columns of rivets on the brake shoe. A press assembly pushes the brake shoe clamped to the brake shoe support assembly against the bias from the spring biased guide onto the punch block so that the rivets are removed. The apparatus is automated using a programmable control logic unit so that an operator only has to clamp the brake shoe onto the brake shoe support assembly and the apparatus completes deriveting the brake shoe.

22 Claims, 10 Drawing Sheets

BRAKE SHOE DERIVETER

BACKGROUND OF THE INVENTION

1. Field of the Invention

This invention relates generally to automotive tooling, and has particular applicability to removal of rivets securing a brake lining to a brake shoe.

2. Description of the Related Art

A common type of brake used in automotive and industrial applications includes a cylindrical brake drum having internal mating brake shoes hydraulically actuated to engage the internal surface of the brake drum. Typically, two segmented brake shoes having curved brake shoe plates matching the drum surface are actuated radially in opposing directions. The brake shoe plate is welded to inward support ribs which can be connected to a wheel or mechanism.

The brake shoes each have a brake lining attached to the surface of the curved plate. Friction between the lining and the rotating drum provides a braking force to slow the rotation of the drum and connected mechanism or wheel. Through repeated use, friction and heat generated during use wear down and deteriorate the brake lining to the point where brake performance is unacceptable. In repairing the brakes of passenger vehicles, the entire brake shoe and the attached brake lining are generally replaced.

However, in the case of trucks and industrial applications, the worn brake lining is removed from the plate of the brake shoe and replaced with a new lining. Replaceable brake linings are attached to the brake shoe plate with rivets which must be removed and replaced during the relining operation. Generally between twenty and thirty-two rivets are arranged in a pattern of rows and columns projecting through the brake lining and brake shoe plate. Different manufactures of brake shoes and different sizes of brake shoes result in multiple patterns of rivet arrangement.

Conventionally, an operator manually removes each rivet individually using a press assembly having a throat into which the brake plate and lining are inserted. The brake shoe is secured in a fixed position by means of a brake shoe support assembly, and the operator moves the press assembly along the plate and lining to remove individual rivets. The press assembly has a hydraulically powered punch rod which extends to engage the rivet and force the rivet through the plate and lining, thereby disengaging the lining. Alternately, a plurality of rivets in a single row are manually expelled using a rivet punch having a plurality of punch rods. This procedure must be repeated for each rivet or row of rivets. Devices which can be used for removing the rivets are described, for example, in U.S. Pat. No. 4,065,843, titled BRAKE SHOE RIVET REMOVAL PRESS, issued Jan. 3, 1978 and U.S. Pat. No. 5,032,129, titled BRAKE SHOE DELINING APPARATUS, issued Aug. 27, 1991.

While the above procedures accomplishes the task of removing the rivets, they are obviously tedious, time-consuming, dangerous to the operator who must manually move the brake shoe along the arcuate path of the press assembly, and subject to failure because of the possible misalignment of the components during any one of the several repositioning steps involved. These procedures also require the undivided attention of the operator for the entire period required to remove the rivets. These factors limit the quantity of shoes that an operator may derivet within a work period and add substantially to the cost of replacing brake linings.

SUMMARY OF THE INVENTION

An apparatus and method for automated removal of rivets connecting a brake lining to a brake shoe is provided. One aspect of the invention provides a method and apparatus which reduces the duration of an operator's time and attention in deriveting brake shoes by merely requiring an operator to position a brake shoe on a support assembly and the apparatus completes deriveting the brake shoe without the need for manual intervention. Further, the risk of harm to the operator and the components is reduced.

In one aspect of the invention, the apparatus includes a frame structure to which a brake shoe support assembly containing a plurality of curved supports is attached through a spring biased guide. The brake shoe support assembly is rotatable through use of a stepper motor so rows of rivets on the brake shoe can be aligned with a punch module. The punch module contains at least one punch block that that can be moved transversely with respect to the brake shoe to be aligned with the different columns of rivets on the brake shoe. Each punch block contains at least one punch bit. The punch bits align with the rivets and force them out of the brake shoe and lining when the brake shoe is pushed down on the punch module. A press assembly is opposed to the punch block and pushes the brake shoe and the brake shoe support assembly against the bias from the spring biased guide onto the punch block so that the rivets are removed. The apparatus is automated using a programmable control logic (PLC) unit which automatically derivets the brake shoe by controlling the operation of the components of the apparatus. The PLC can store more than one program so that brake shoes with various rivet patterns can be deriveted by the apparatus.

BRIEF DESCRIPTION OF THE DRAWINGS

The features and advantages of the invention will become more apparent from the detailed description set forth below when taken in conjunction with the drawings wherein.

DETAILED DESCRIPTION OF THE PREFERRED EMBODIMENT

Figure 1:
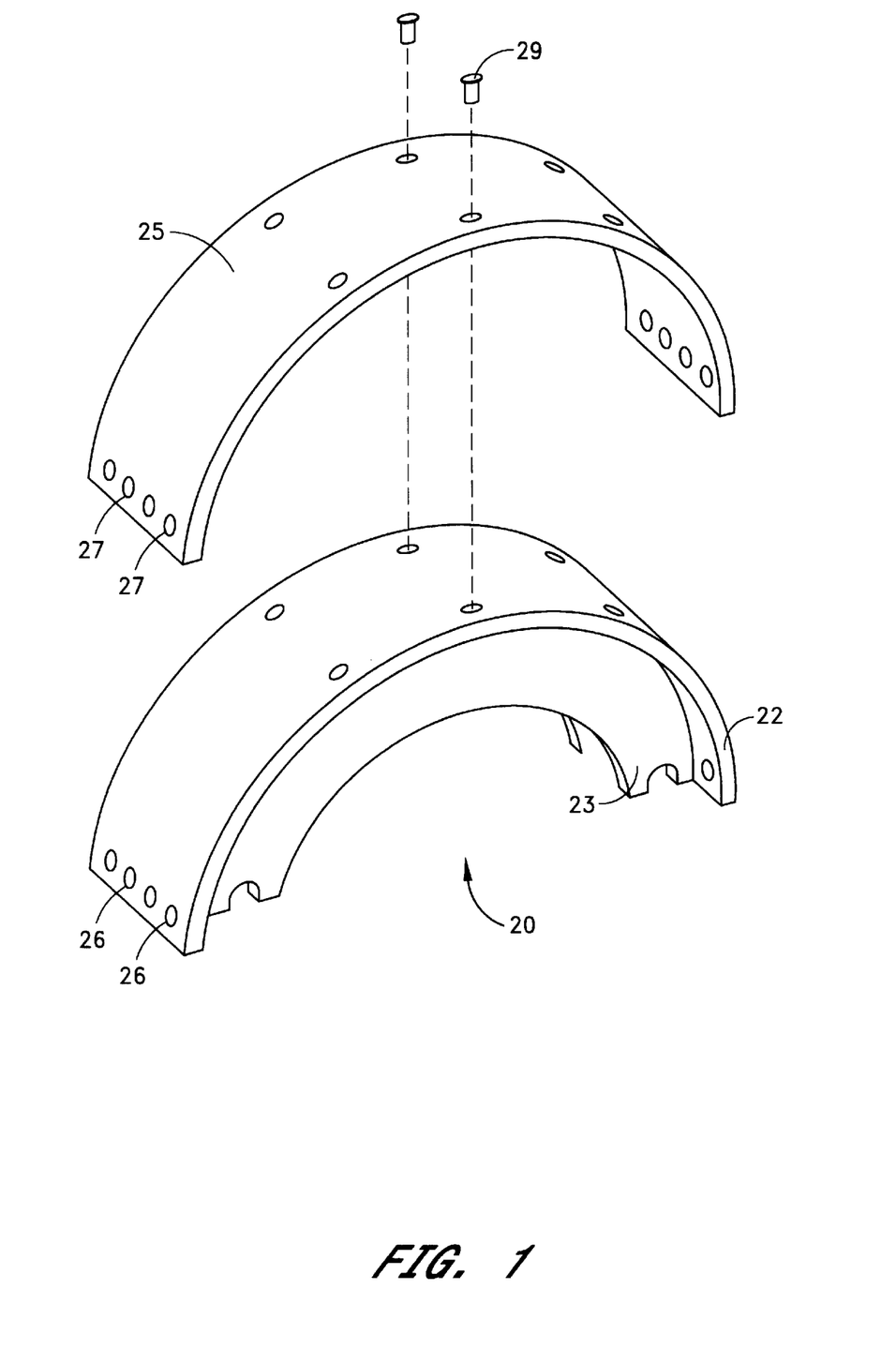
FIG. 1 is an exploded perspective view of a brake shoe and associated brake lining.

FIG. 1 is an exploded perspective view of a brake shoe 20 with a curved brake shoe plate 22 attached to support ribs 23 for mounting the brake shoe to a brake mechanism. A removable brake lining 25 is curved for attachment to the curved brake shoe plate 22. Both the brake shoe plate 22 and the brake lining 25 have a plurality of holes 26 and 27 which align when the brake lining 25 is properly positioned on the brake shoe plate 22. The brake lining 25 is attached to the brake shoe plate 22 by rivets 29 secured through the aligned holes 26 and 27 as can be seen in FIG. 1.

Figure 2:
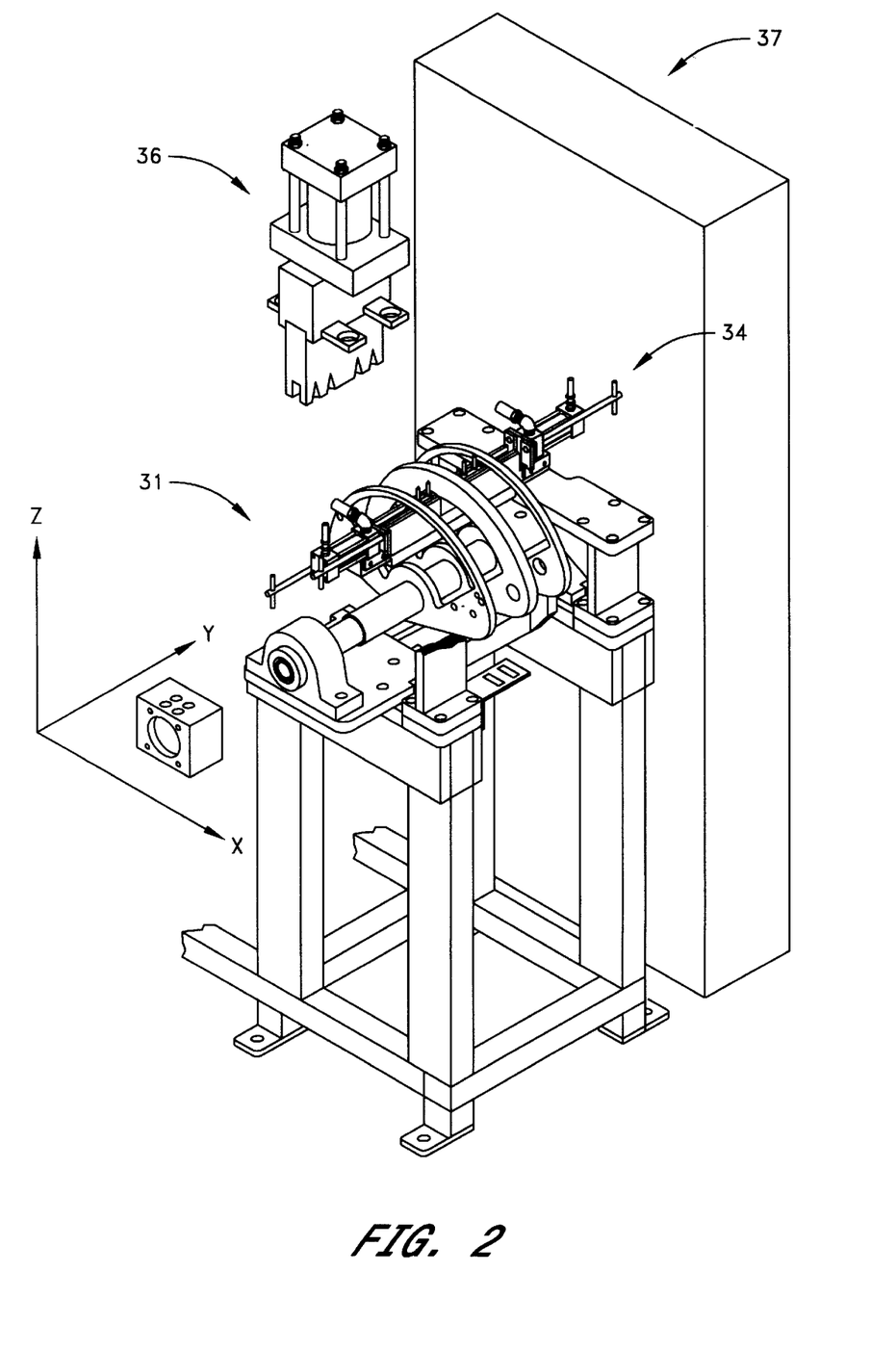
FIG. 2 is a perspective view of an apparatus according to the principles of the invention.

FIG. 2 is a perspective view that illustrates one embodiment of the invention which provides an automated system for removing rivets from brake shoes having various rivet patterns. The automated brake shoe deriveter includes a frame structure 30, a brake shoe platform 31, a rivet punch module 34, a press assembly 36, and a programmable control system 37. The frame structure 30 provides a rigid framework for the deriveter. The brake shoe platform 31 includes a clamp to hold a brake shoe thereon and is capable of rotating about the rivet punch module 34 so that all of the rivets attaching a brake lining to a brake shoe can be aligned with the rivet punch module 34. The brake shoe platform 31 is also moveable along the Z-axis relative to the rivet punch module 34. The rivet punch module 34 holds the punch bits stationary while the brake shoe platform 31 and brake shoe are pushed onto the punch bits along the Z-axis. The rivet punch module 34 can include at least one punch block moveable along the Y-axis relative to the brake shoe platform 31 to align with different rivet configurations. The press assembly 36 provides the force to push the brake shoe onto the punch module 34. The programmable control system 37 provides control signals and controls the hydraulic and electrical systems to coordinate the movement of the brake shoe platform 31, the press assembly 36, and the rivet punch module 34 as described below.

Figures 3, 3A:
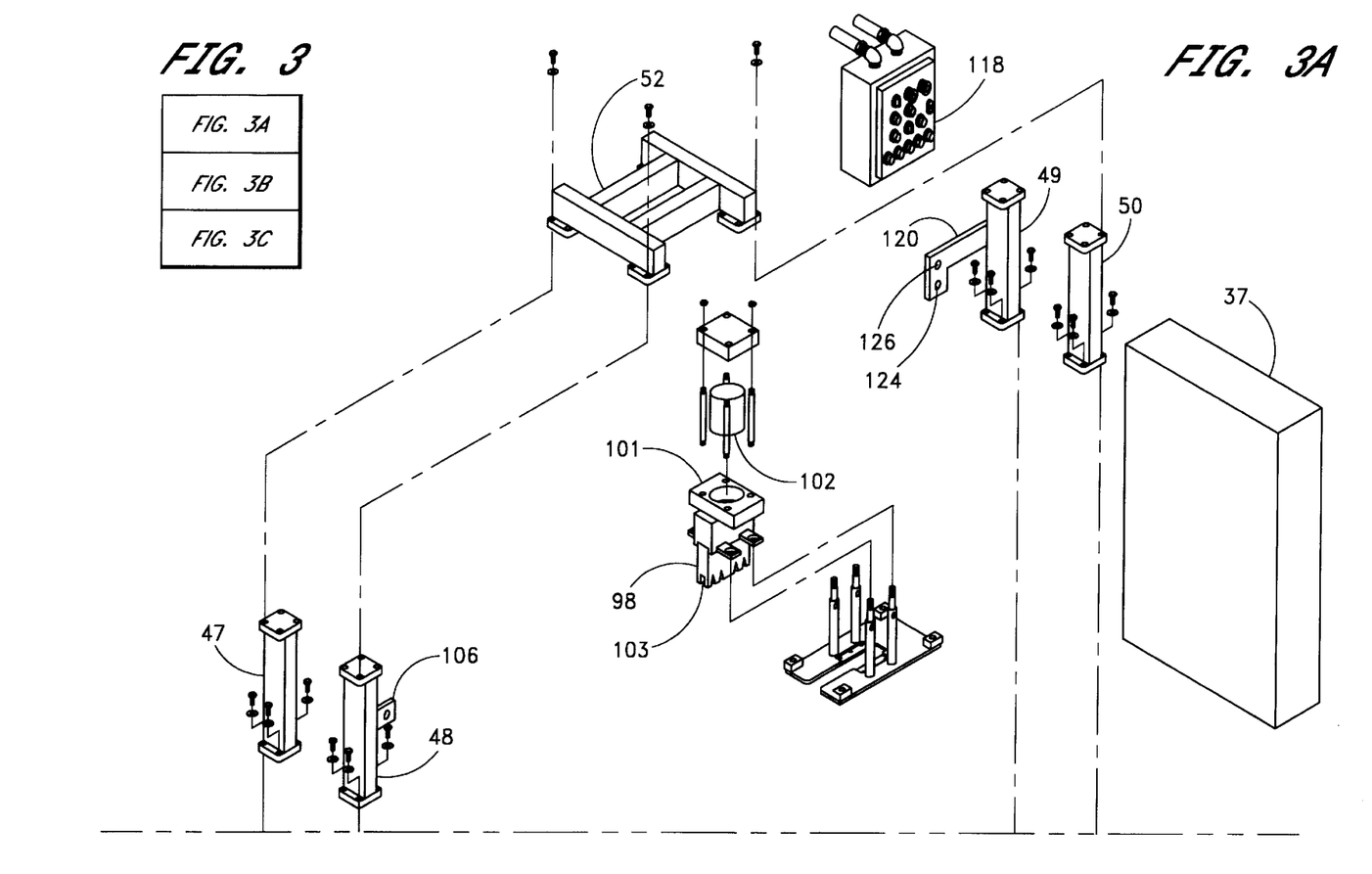
FIG. 3 is an exploded perspective view of the apparatus.
Figure 3B:
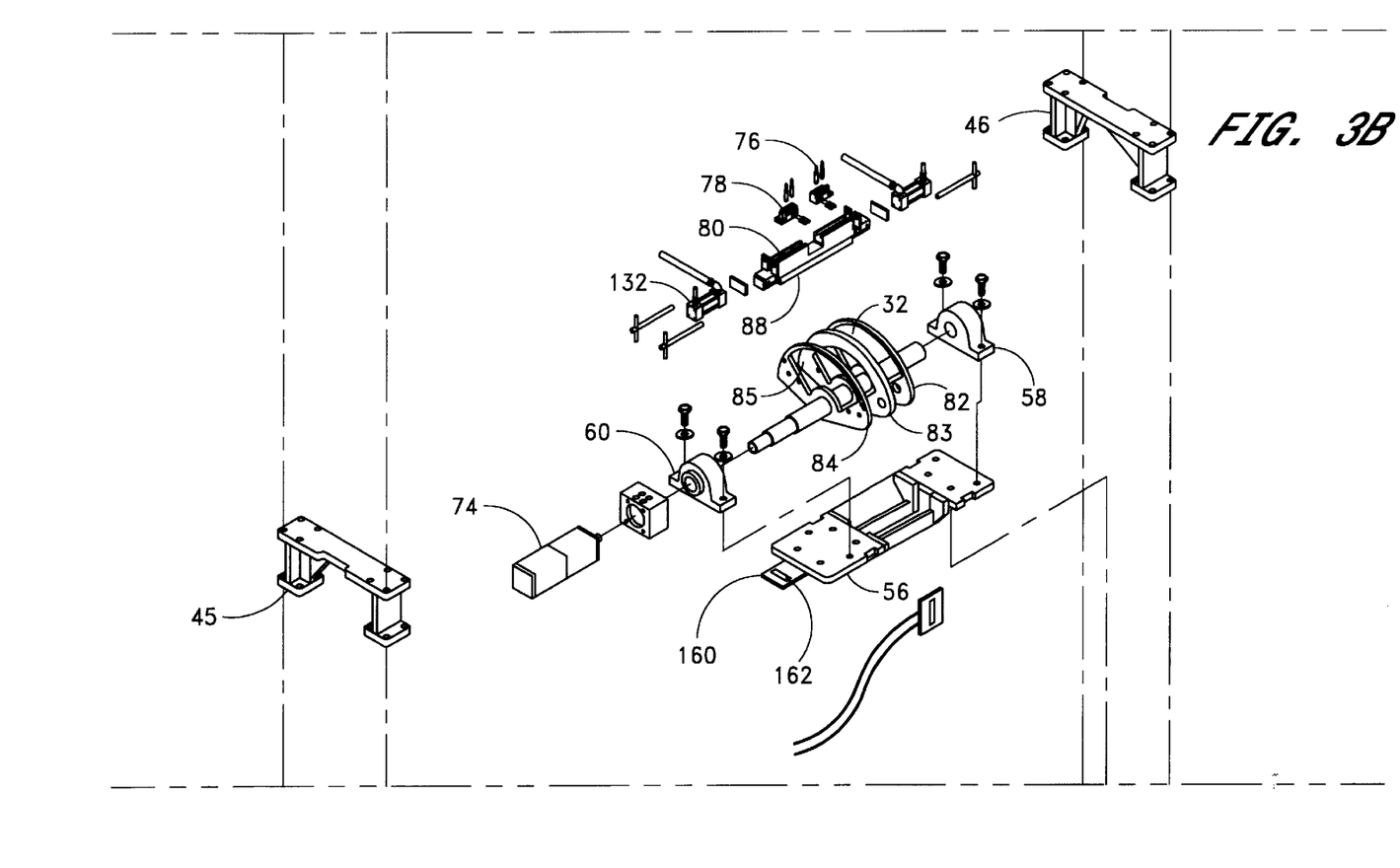
Figure 3C:
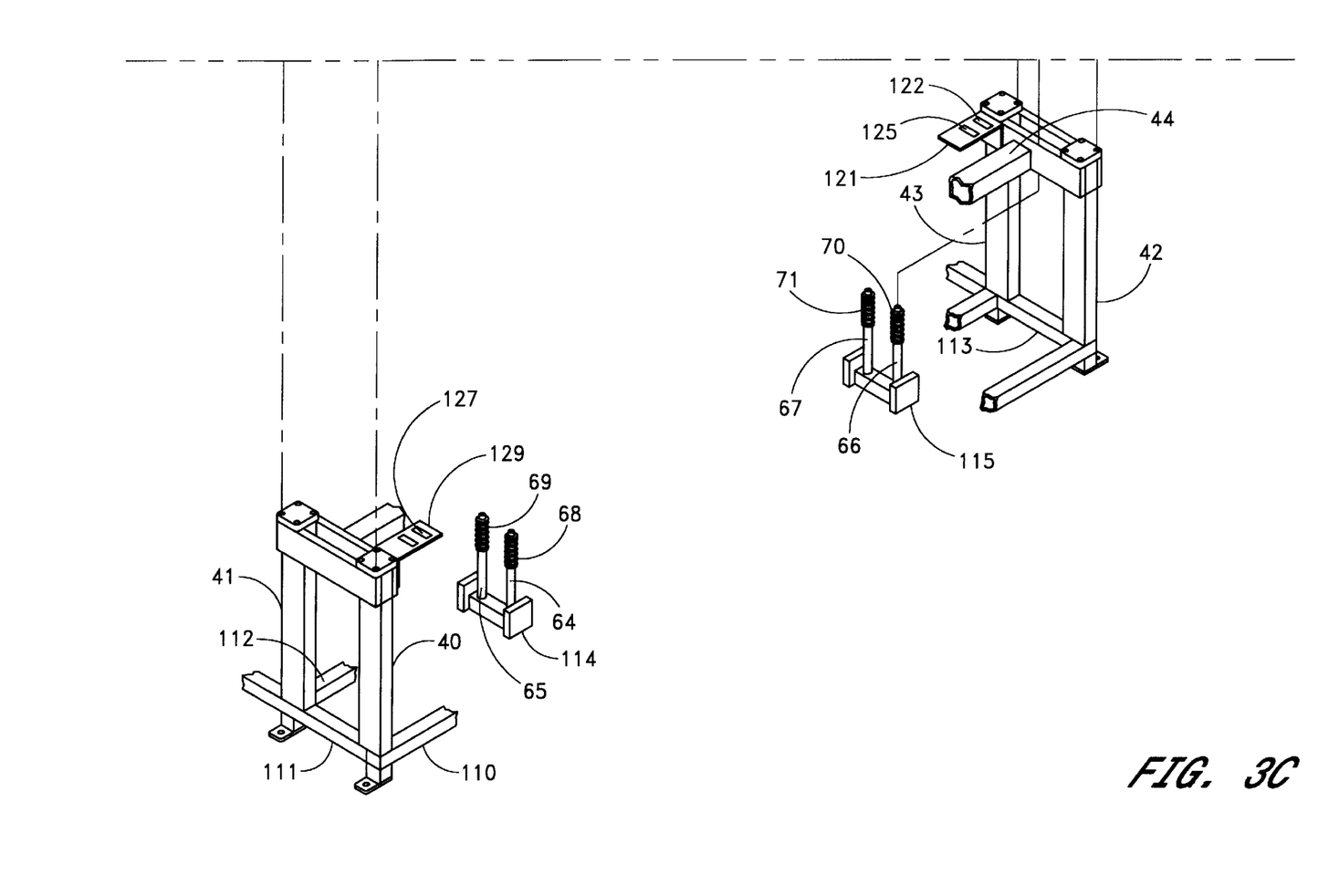

FIG. 3 is an exploded perspective view of the embodiment of the invention shown in FIG. 2. The hydraulic lines and electrical lines are not shown for ease of viewing. The frame structure 30 (see FIG. 2) includes four vertical leg members 40, 41, 42 and 43. The leg members 40, 41, 42 and 43 are attached at their lower ends to four lower braces 110, 111, 112 and 113 which form a rectangular framework. The four leg member 40, 41, 42 and 43 are attached at their upper ends to the outward four ends of an I-shaped base beam 44. Two motor spacer beams 45 and 46 are attached to the respective outward ends of the I-shaped base beam 44. The lower ends of four upper supports 47, 48, 49 and 50 are attached to an end of the respective motor spacer beams 45 or 46. The upper ends of the four upper supports 47, 48, 49 and 50 are attached to a crosshead beam 52. Alternatively, other supporting structures of various configurations could be used to support the automated brake shoe deriveter.

The brake shoe platform 31 (see FIG. 2) includes a brake shoe support assembly 32 attached to a shaft 54. The shaft 54 is rotatably attached to a support base plate 56 with collars 58 and 60 at each end of the shaft 54. The brake shoe platform 31 can move in the Z-axis (see FIG. 2) relative the frame structure 30 (see FIG. 2) via a two part spring biased platform guide. The platform guide includes four guide posts 64, 65, 66 and 67. The lower ends of the guide posts 64 and 65 are attached to a foot beam 114. The lower ends of guide posts 66 and 67 are attached to a second foot beam 115. Openings in the support base plate 56 receive the upper ends of the four guide posts 64, 65, 66 and 67 so that the guide posts 64, 65, 66 and 67 are slidably attached to the support base plate 56. Helical springs 68, 69, 70 and 71 are positioned around the upper portion of the respective guide posts 64, 65, 66 and 67. The two part spring biased platform guide allows for movement of the support base plate 56 and brake shoe support assembly 32 in a linear direction along the guide posts 64, 65, 66 and 67 independent from the frame structure 30. A downward force is required to move the brake shoe support assembly 32 against the bias or force of the springs 68, 69, 70 and 71, and a relaxation of the downward force will allow the brake shoe support assembly 32 to move back to its neutral position. Alternatively, other sources of force or bias such as other types of spring mechanisms or pneumatic or hydraulic pressure can be used instead of the helical springs 68, 69, 70 and 71.

A controllable rotation mechanism 74, such as a stepper motor, is attached to an end of the shaft 54. The stepper motor 74 rotates the brake shoe support assembly 32 via the shaft 54 under the control of the programmable control system 37 to align the brake shoe 20 as described below. Alternatively, the controllable rotation mechanism 74 can be a servo motor or other suitable power source.

The brake shoe support assembly 32 includes three curved supports 82, 83 and 84. The curved supports 82, 83 and 84 are configured to receive and support the curved brake shoe. The curved supports 82, 83 and 84 are spaced from one another to allow access to the rivets 29 (see FIG. 1) securing the brake lining 25 to the brake shoe plate 22. The curved supports 82, 83 and 84 have a cutout section 85. The rivet punch module 34 is positioned in the cutout section 85 without interfering with the rotation of the brake shoe support assembly 32 as explained below.

The rivet punch module 34 (see FIG. 2) includes a punch block support slide 88 mounted to the upper supports 47, 48, 49 and 50. The punch block support slide 88 passes through the cutout sections 85 of the curved supports 82, 83 and 84 of the brake shoe support assembly 32. This enables the brake shoe support assembly 32 to rotate about the shaft 54 approximately 120° without interfering with the rigidly attached punch block support slide 88.

In one embodiment, two punch blocks 78 are slidably positioned in the punch block support slide 88. Each punch block 78 contains one or more punch bits 76. A shuttle assembly is coupled to each punch block 78. The shuttle assembly slides the punch block 78 in the punch block support slide 88 under the control of the programmable control system 37. The shuttle assembly includes a hydraulic shuttle cylinder 132 coupled to the punch block 78, as described below. When a force is applied to extend the hydraulic shuttle cylinder 132, the punch block 78 extends to a first punch block position wherein all the punch bits 76 on the punch block 78 align with rivets on the brake shoe. When a hydraulic force is applied to retract the shuttle cylinder 132, the punch block 78 retracts to a second punch block position. This allows the punch bits to be aligned for different rivet configurations and can allow for at least one punch bit 76 to be beyond the edge of the brake shoe and thereby punch varying numbers of rivets in a single row.

The press assembly 36 (see FIG. 2) is mounted on the crosshead beam 52 and located opposite the punch module 34. The press assembly 36 includes a hydraulic cylinder 101 housing an extendable hydraulic ram 102. The hydraulic ram 102, when extended, contacts the brake shoe supported on the brake shoe support assembly 32 through fingers 98. The fingers 98 have a cutout charnel 103 so as not to interfere with the removal of the rivets when in contact with the brake shoe. A control valve 100 (not shown) selectively ports hydraulic fluid to the hydraulic cylinder 101 under the control of the programmable control system 37 to extend and retract the hydraulic ram 102. Extending the hydraulic ram 102 forces the brake shoe support assembly 32 and a brake shoe clamped thereon towards the punch block 78, thereby expelling the rivets from the brake shoe.

The programmable control system 37, such as an Omeron programmable logic control (PLC) unit, executes a PLC program stored therein in a computer readable storage medium and typically includes a micro-processor. The programmable control system 37 controls and coordinates movement of the of the brake shoe support assembly 32 via the stepper motor 74, the press assembly 36 via the control valve 100, and the punch block 78 via the shuttle cylinder 132. Operator interaction with the programmable control system 37 can suitably take place via a control board 118 attached to the crosshead beam 52, or alternately on a separate control board. The programmable control system 37 controls the operation of the apparatus such that at least one pattern of rivets used on a brake shoe 20 can be stored and recalled by operator selection such that the programmable control system 37 can automatically derivet all of the rivets 29 of a brake shoe 20 having the rivets arranged in the known pattern.

A first sensor bracket 120 is attached to the upper support 49, behind and proximate the hydraulic ram 102. A stroke proximity sensor 124, such as an Omeron proximity sensor, is attached to the first sensor bracket 120. The stroke proximity sensor 124 is positioned so as to generate. a signal or trigger on the upstroke of the ram 102 when the ram 102 is at mid stroke. The proximity sensor can of any type capable of determining the position of a movable object and generating an electrical signal, such as a magnet detector, an optical detector or an acoustic detector. The stroke proximity sensor 124 detects when the ram 102 has retracted a sufficient distance so that the fingers 98 on the ram 102 are no longer pressing down on the brake shoe. In response to the signal from the stroke proximity sensor 124, the control system 37 causes the hydraulic ram 102 to stop retracting. At this point, the brake shoe support assembly 32 is returned to the neutral position by the bias from the helical spring 68, 69, 70 and 71. With the ram 102 clear, the brake shoe support assembly 32 can rotate to the next position. Allowing the ram 102 to stop before it has fully retracted conserves hydraulic energy and decreases the time required to perform each step.

An up proximity sensor 126 is attached to the first sensor bracket 120. The up proximity sensor 126 is positioned to trigger when the ram 120 is fully retracted.

A second sensor bracket 121 is attached to the I-shaped base beam 44. A seating proximity sensor 122, such as an Omeron proximity sensor, is attached to the second sensor bracket 121. The seat proximity sensor 122 is positioned proximate the support base plate 56 so as to generate a signal when the support base plate 56 has moved slightly, such as 1/16 inch. To ensure proper position of the brake shoe, the operator seats the brake shoe by causing the hydraulic ram 102 to move down until the support base plate 56 has moved down slightly, signaling pressure on the brake shoe. The signal is sent to the programmable control system 37. This "seating" can be used to ensure that the brake shoe is properly seated on the brake shoe support assembly 32 prior to the deriveting process.

A first down proximity sensor 125 is attached to the second sensor bracket 121. The first down proximity sensor 125 is positioned proximate the support base plate 56 and generates a signal when the support base plate 56 has moved a sufficient distance to indicate that the brake shoe has moved down far enough for the rivet punch bits 76 to remove the rivets. The signal from the sensor 125 is sent to the programmable control logic 37. Additional down proximity sensors, such as a second down proximity sensor 127, can be attached to a third sensor bracket 129 attached to the I-shaped base beam 44. The second down proximity sensor 127 is used for brake shoes with different brake shoe plate thicknesses, allowing multiple sizes of brake shoes to be deriveted using the apparatus of the invention.

A third sensor bracket 160 is attached to the support base plate 56 directly below the shaft 54. A fixture rotation home proximity sensor 162 is attached to the third sensor bracket 160. The fixture rotation proximity sensor 162 is used during the initial power up of the apparatus. The servo motor 74 rotates the brake shoe support assembly 32 until the fixture rotation home proximity sensor 162 generates a signal identifying a home position. The signal generated by the sensor 162 is sent to the programmable control logic 37.

An optical or mechanical guide 106 is attached to the upper support 48 to ensure that the brake shoe is positioned on the brake shoe support assembly 32 in a known position. The guide 106 can be positioned to align with a first rivet when the brake shoe is properly seated. Small adjustments in alignment can be made by the user via the programmable control system 37.

Figure 4:
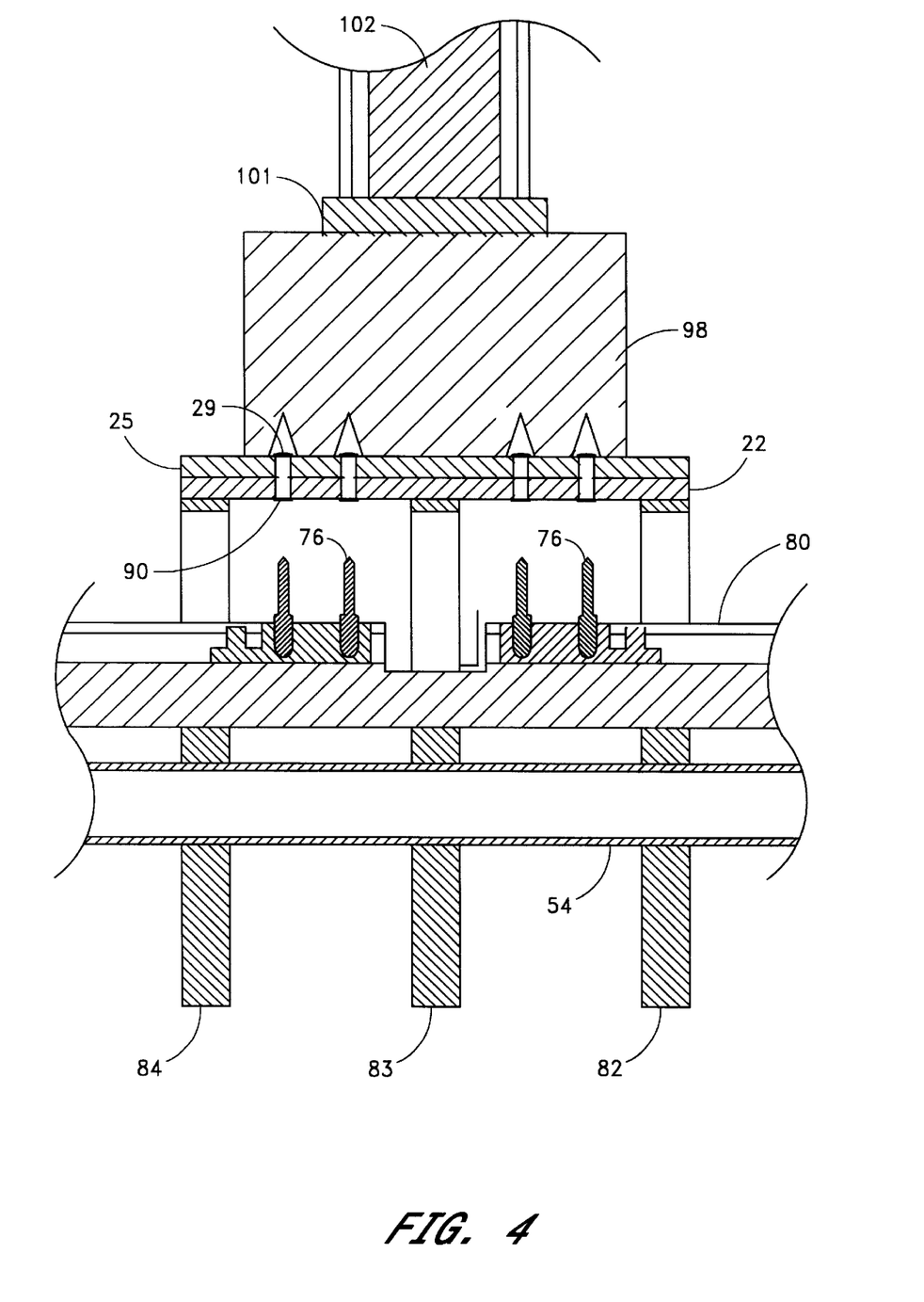
FIG. 4 is a frontal cross section view of a brake shoe and brake lining positioned on the apparatus.
Figure 5:
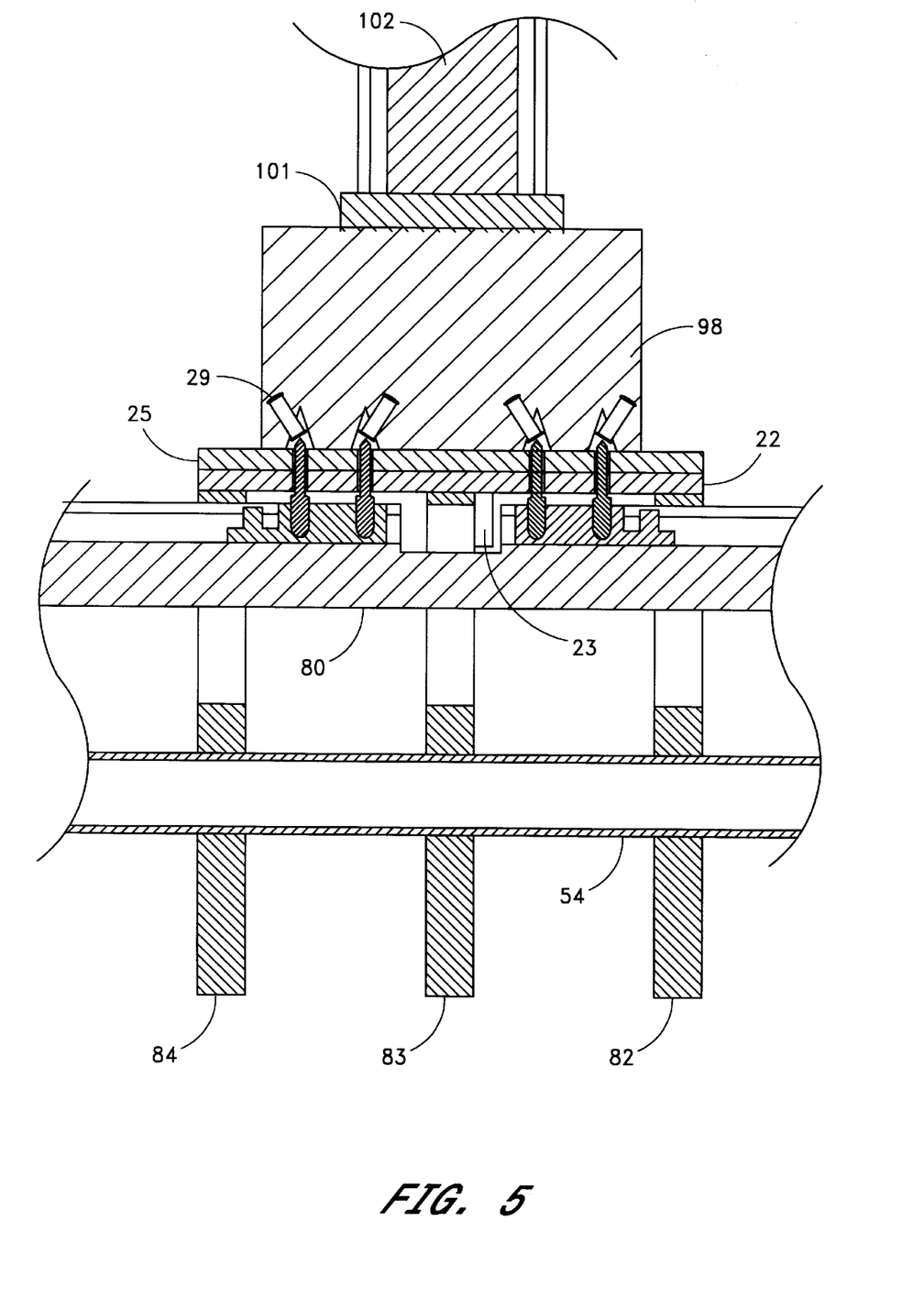
FIG. 5 is a frontal cross section view showing the hydraulic ram actuator in a lowered position forcing the brake shoe and brake shoe support assembly downward relative to the stationary punch bits to remove the rivets.

FIG. 4 is a frontal cross section of the apparatus of FIG. 2 with the brake shoe 20 of FIG. 1 clamped onto the brake shoe support assembly 32 and the ram 102 in the raised position. The programmable control system controls the operation of the control valve 100 to send hydraulic oil to the hydraulic cylinder 101, thereby extending the hydraulic ram 102 and moving the hydraulic ram 102 toward the brake shoe 20 and brake shoe support assembly 32. The fingers 98 of the hydraulic ram 102 contact the brake shoe 20 and push the brake shoe 20 and brake shoe support assembly 32 in a downwards motion. The hydraulic ram 102 extends until the seating proximity sensor 122 is triggered and sends a signal to the programmable control system 37, thereby ensuring that the brake shoe 20 is properly seated. The programmable control systems causes the hydraulic ram 102 to retract until the stroke proximity sensor 124 is triggered. The programmable control system 37 directs the stepper motor 74 to rotate the brake shoe support assembly 32 to align the first row of rivets 29 on the brake shoe 20. The programmable control system 37 then causes the hydraulic ram 102 to extend towards the brake shoe and push the brake shoe 20 onto the punch block 78 against the bias from the helical springs 68, 69, 70 and 71. The punch bits 76 contact the rivets 29 in the brake shoe 20, and as the brake shoe 20 is further pushed down, the punch bits 76 push the rivets 29 through the brake shoe plate 22 and brake lining 25. FIG. 5 is a frontal cross section similar to FIG. 4 that shows the hydraulic ram 102 in a lowered position, thereby forcing the brake shoe 20 and brake shoe support assembly 32 downward relative to the stationary punch bits 76 and removing the rivets 29.

Next, the programmable control system 37 causes the control valve 100 to switch and oil flows from the hydraulic cylinder 101. The hydraulic ram 102 retracts back into the hydraulic cylinder 101 until the stroke proximity sensor 124 triggers and sends a signal to the programmable control system 37. The bias from the helical spring 68, 69, 70 and 71 returns the brake shoe support assembly 32 to the neutral position. The stepper motor 74 then rotates the brake shoe support assembly 32 under direction from the programmable control system 37 to align the punch bits 76 with the next row of rivets 29. The shuttle cylinder 132 extends or retracts as directed by the programmable control system 37 to move the punch block 78 in the punch block support slide 88 to align the punch bits 76 with the column of rivets 29. The procedure is repeated until all the rivets are removed.

Figure 6:
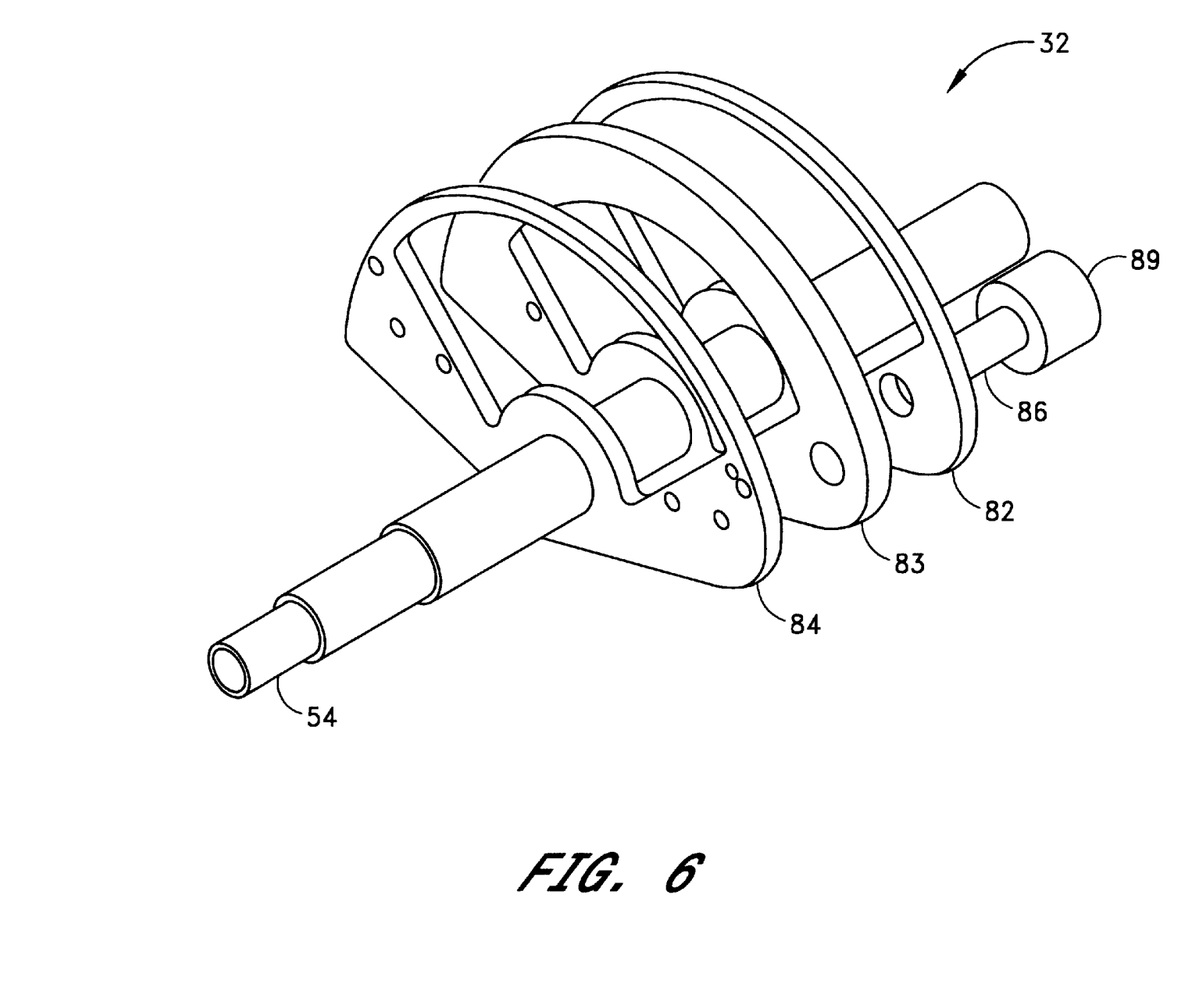
FIG. 6 is a perspective view of the curved supports of the brake shoe support assembly.

FIG. 6 is a perspective view of the brake shoe support assembly 32. The brake shoe support assembly 32 includes the three curved supports 82, 83 and 84. The curved supports 82, 83 and 84 are spaced from one another to allow access to the rivets securing the brake lining to the brake shoe plate. FIG. 6 illustrates the cutout section 85 in the curved supports 82, 83 and 84. The cutout section 85 allows rotation of the brake shoe support assembly 32.

The two outer curved supports 82 and 84 are configured to receive the brake shoe. An extendable hydraulic clamp ram 86 in a clamp cylinder 89 pushes the first outer curved support 82 in a direction toward the second outer curved support 84 to clamp the brake shoe onto the brake shoe support assembly 32. A solenoid operated clamp valve 87 (not shown) directs the flow of hydraulic fluid to the clamp cylinder 89. Alternatively, a manual clamping mechanism or other suitable mechanism to secure the brake shoe can be used.

Figure 7:
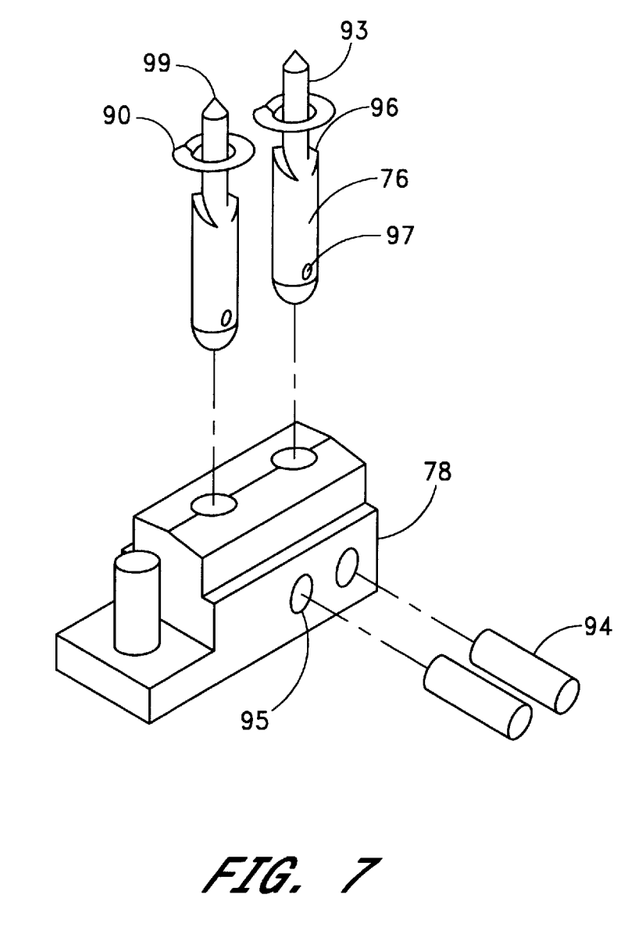
FIG. 7 is a perspective view of a punch block illustrating the punch bits with a cutting edge secured in the punch block with a pin.

FIG. 7 is a perspective view of the punch block 78. Each punch bit 76 is secured in the punch block 78 by a pin 94. The pin 94 passes through a hole 95 in the side of the punch block 78. The tip of pin 94 inserts into a hole 97 in the punch bit 76 proximate the base of the punch bit. The pin 94 can be removed to easily remove the punch bits 76 to facilitate replacement.

The rivets of brake shoes have rolled end edges 90 for securing the rivets in the brake shoe plate and lining. When removing the rivets using the apparatus of the invention, the rolled end edges 90 of the rivets shear off forming rings which encircle the punch bits 76. Each punch bit 76 can include a cutting edge 96 integral to and proximate the base of the punch bit 76. The cutting edge 96 is located sufficiently close to the base of the punch bit 76 so that there is sufficient length of a punch bit shaft 93 between the cutting edge 96 and the punch bit tip 99 to pass through the brake shoe plate and brake shoe lining. This positions the cutting edge 96 so as to avoid contact with the brake shoe plate during the punch operation, but as rivet end rings 90 move down the punch bits 76, the rivet end rings 90 are forced against the cutting edges 96 and are cut in half.

Figure 8:
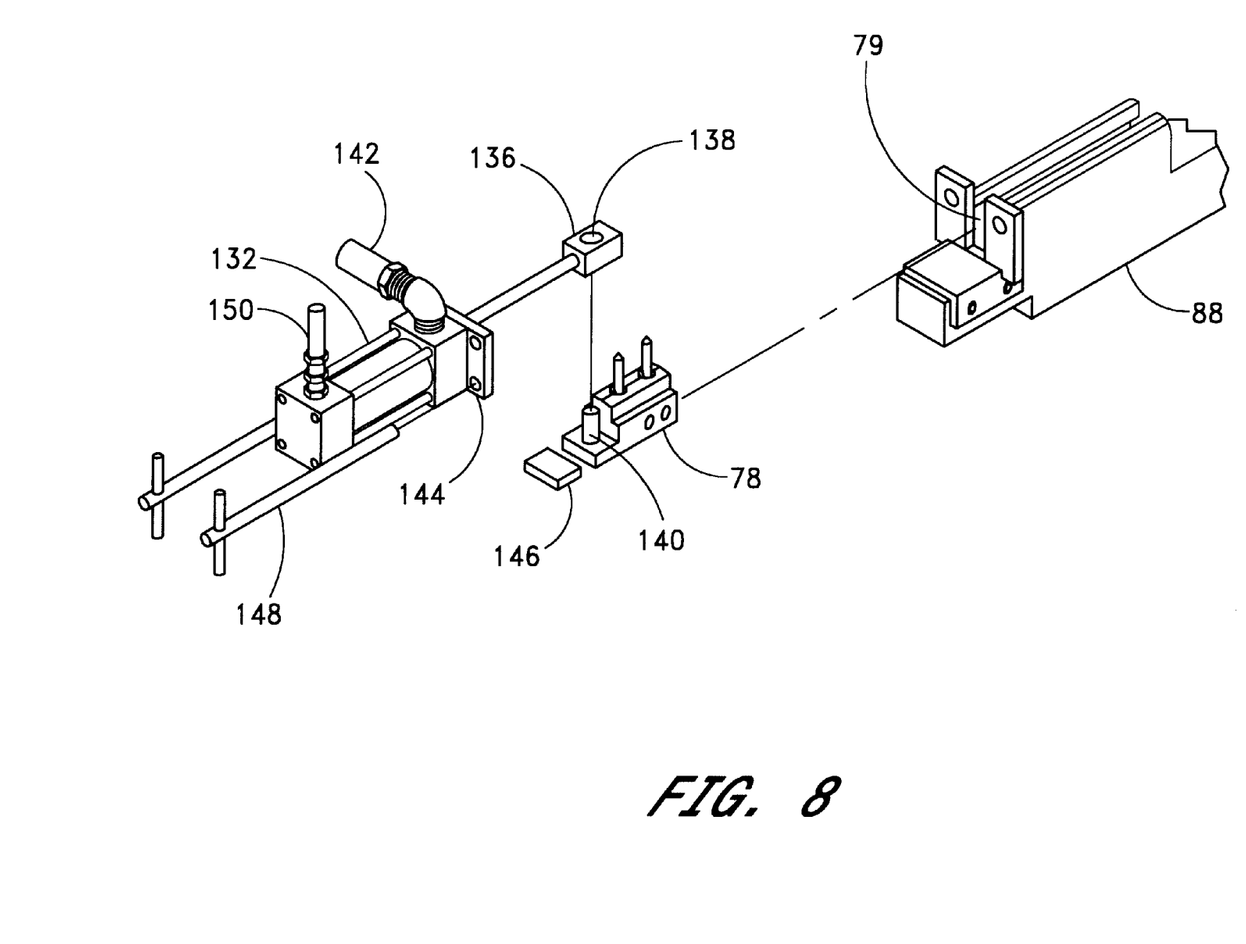
FIG. 8 is an exploded perspective view of the shuttle assembly.

FIG. 8 is an exploded perspective view of one of the shuttle assemblies coupled to one of the punch blocks 78 on the punch block support slide 88. The support slide 88 receives the punch block 78 in the channel 79. The shuttle assembly includes a shuttle cylinder 132 with a shuttle rod 134 attached to the inward end of the shuttle cylinder 132. The other end of the shuttle rod 134 is attached to a shuttle connector 136. The shuttle connector has a hole 138 that receives a shuttle pin 140 located on the punch block 78, thereby coupling the shuttle cylinder 132 to the punch block 78. A hydraulic valve 142 (not shown) controls the flow of hydraulic fluid to the shuttle cylinder 132 through a supply pipe 142. When a force is applied to extend the shuttle cylinder 132, the punch block 78 extends along the channel 79 to a first punch block position wherein all the punch bits 76 on the punch block 78 align with rivets on the brake shoe 20. When a force is applied to retract the shuttle cylinder 132, the punch block 78 retracts to a second punch block position so that at least one punch bit 76 is beyond the edge of the brake shoe 20.

A support slide end plate 144 is attached to the end of the punch block support slide 88. A stop block 146 is removably positioned on the punch block support slide 88 adjacent the support slide end plate 144. When the shuttle cylinder 132 retracts, the punch block 78 also retracts until it contacts the stop block 146. Varying the length dimension of the stop block 146 is used to control the position of the punch block 78 in the retracted second position. This allows the punch block 78 to align with the different rivet patterns encountered in different sizes of brake shoes.

Alternatively, the punch block 78 can move towards the brake shoe support assembly 32 to punch out the rivets 29. Similarly, the brake shoe support assembly 32 can be stationary and the punch module 34 and press assembly 36 be attached to the stepper motor 74 in such a way to allow travel in an arcuate path and align with the rivets 29 on the brake shoe 20.

Although the foregoing detailed description has been primarily directed to a preferred embodiment of the present invention, it should be understood that this has been done by way of example only and not by way of limitation. One skilled in the art would recognize variations and modifications of the present invention within the scope of the present claims.

What is claimed is:

1. An apparatus for removing a brake lining from a brake shoe, the brake lining being riveted to the brake shoe with a plurality of rivets through rivet holes in the brake lining and brake shoe, the apparatus comprising:

a frame structure;

a brake shoe platform comprising a support base plate, a shaft rotatably attached to the support base plate, a brake shoe support assembly attached to the shaft, and a clamp for removably clamping the brake shoe to said brake shoe support assembly;

a rotating mechanism coupled to the shaft;

a platform guide for the brake shoe platform, comprising of a plurality of guide posts and at least one spring, said guide posts slidably attached to the support base plate allowing the brake shoe platform to move relative to the frame structure from a first to a second position against the bias of the spring, and to move back from the second to the first position by the spring bias;

a punch module mounted on the frame structure comprising a punch block slidably attached in a punch block support slide;

a shuttle assembly for moving the punch block along the support slide;

a press assembly coupled to the frame structure opposite the punch module; and a programmable control unit connected with the rotating mechanism to control rotation of the brake shoe support assembly, further connected to the shuttle assembly to control reciprocation of the punch block, and further connected to the press assembly to control movement of the press assembly.

2. The apparatus of claim 1, further comprising an optical or mechanical guide to align the brake shoe on the brake shoe support assembly in a known position.

3. The apparatus of claim 1, wherein the brake shoe support assembly comprises a plurality of curved support members for receiving the curved brake shoe.

4. The apparatus of claim 3, wherein the curved support members have a cutout section in the interior of the curved support member.

5. The apparatus of claim 4, wherein the punch module is positioned in the cutout section of the curved support members, thereby positioning the punch bit between the curved support members.

6. The apparatus of claim 1, wherein the punch block contains a plurality of punch bits.

7. The apparatus of claim 6, wherein the punch bits that are secured in the punch block with a pin.

8. The apparatus of claim 1, wherein the shuttle assembly comprises an extendable hydraulic shuttle cylinder coupled to the punch block configured to linearly move the punch block in the punch block support slide.

9. The apparatus of claim 8, wherein there are two punch blocks slidably positioned on the shuttle support slide, with each punch block having a shuttle assembly.

10. The apparatus of claim 8, further comprising a removable stop block positioned on the punch block support slide, wherein the stop block limits the distance the punch block can be retracted.

11. The apparatus of claim 1, wherein the press assembly comprises an extendable hydraulic ram and a control valve governing the movement of the hydraulic ram.

12. The apparatus of claim 1, wherein the a rotating mechanism is a stepper motor connected to the shaft of the brake shoe platform for rotating the brake shoe support assembly in step increments.

13. The apparatus of claim 1, further comprising program storage storing rivet patterns of a plurality of different brake shoes.

14. The apparatus of claim 1, wherein the punch bit includes an integral chisel proximate the base of the punch bit.

15. The apparatus of claim 1, wherein the brake shoe assembly is held stationary and the punch module and the press assembly are attached to the rotational mechanism and travel in the pattern of the rivets.

16. An apparatus for removing a brake lining from a brake shoe, the brake lining being riveted to the brake shoe with a plurality of rivets, the apparatus comprising:

a frame structure;

a brake shoe platform comprising a rotatable shaft, brake shoe support assembly attached to the shaft, and a clamp means for removably clamping the brake shoe against the brake shoe support assembly;

means for guiding movement of the brake shoe platform, which means allow the support assembly to move relative to the frame structure from a first to a second position when a force is applied, and to move back from the second to the first position when the force is removed;

a punch module mounted on the frame structure comprising a punch block slidably attached in a punch block support slide, wherein the punch block includes at least one rivet punch bit;

means for pressing the brake shoe support assembly from the first to a second position relative to the frame structure along the brake shoe platform guide means towards the punch block;

rotating mechanism means for rotating the brake shoe support assembly in step increments to align the punch bits with the rivets on the brake shoe;

reciprocatory shuttle means for moving the punch block along the support slide; and a programmable control unit connected with the rotating mechanism means to control rotation of the brake shoe support assembly, further connected to the reciprocatory shuttle means to control movement of said punch block, and further connected to the press assembly means to control movement of said press assembly to thereby cause the rivets of a brake shoe to be removed.

17. An apparatus for removing a brake lining from a brake shoe, the brake lining being riveted to the brake shoe with a plurality of rivets, the apparatus comprising:

a frame structure;

a brake shoe platform comprising a support base plate, a shaft rotatably attached to the support base plate, and a brake shoe support assembly attached to the shaft, and;

a rotating mechanism coupled to the shaft and configured to controllably rotate the brake shoe support assembly;

a punch module mounted on the frame structure and comprising a punch block slidably attached in a punch block support slide and a shuttle assembly configured to controllably slide the punch block along the support slide;

a press assembly mounted on the frame structure opposite the punch module; and a programmable control unit coupled with the rotating mechanism to control rotation of the brake shoe support assembly, to the shuttle assembly to control movement of the punch block, and to the press assembly to control movement of the press assembly.

18. The apparatus of claim 17, further comprising a clamp for removably clamping a brake shoe against the brake shoe support assembly.

19. The apparatus of claim 18, further comprising a biased guide comprising at least one guide attached to the support base plate and having a helical spring along its length, the guide slidably engaged with the brake shoe platform thereby allowing the brake shoe platform to moved relative to the frame structure from a first to a second position against the spring bias, and to be moved back from the second to the first position by the spring bias.

20. The apparatus of claim 18, wherein punch block contains a plurality of punch bits.

21. The apparatus of claim 18, wherein the rotating mechanism is a stepper motor connected to the shaft of the brake shoe platform for rotating the brake shoe support assembly in step increments.

22. An apparatus for removing a brake lining from a brake shoe, the brake lining being riveted to the brake shoe with a plurality of rivets, the apparatus comprising:

a frame structure;

a brake shoe platform comprising a support base plate, a shaft rotatably attached to the support base plate, and a brake shoe support assembly attached to the shaft, and;

a motor coupled to the shaft and configured to controllably rotate the brake shoe support assembly;

a punch module mounted on the frame structure and comprising a punch block slidably attached in a punch block support slide, the punch block having at least two punches, whereby the punch block can move along the support slide from a position wherein the more of the punches are aligned with the brake to a position wherein less of the punches are aligned with the brake; and a press assembly mounted on the frame structure opposite the punch module.

* * * * *